United States Patent [19]

Haardt et al.

[11] Patent Number: 4,681,295
[45] Date of Patent: Jul. 21, 1987

[54] TRICURVE OPTICAL METAL MASTER MOLD AND METHOD OF MAKING

[75] Inventors: Henry Haardt, Henryville, Pa.; John Magdon, Phillipsburg, N.J.

[73] Assignee: International Hydron Corporation, Woodbury, N.Y.

[21] Appl. No.: 759,918

[22] Filed: Jul. 29, 1985

Related U.S. Application Data

[63] Continuation of Ser. No. 498,348, May 26, 1983, abandoned.

[51] Int. Cl.$^4$ ............................................. B27D 11/00
[52] U.S. Cl. ................................... 249/135; 82/1 C; 249/175; 264/1.1; 264/2.5; 425/808
[58] Field of Search ............... 425/808; 249/135, 175; 264/2.5; 82/1 C

[56] References Cited

U.S. PATENT DOCUMENTS

| | | | |
|---|---|---|---|
| 2,300,210 | 10/1942 | Dittmer | 264/2.5 |
| 3,460,928 | 8/1969 | Cosho | 264/2.5 |
| 3,698,802 | 10/1972 | Baron | 351/160 H |
| 3,871,813 | 3/1975 | Cappeli | 425/808 |
| 4,084,890 | 4/1978 | Bason | 264/1.1 |
| 4,127,896 | 10/1978 | Shepherd | 425/808 |
| 4,193,672 | 3/1980 | Trombley et al. | 351/160 R |
| 4,194,815 | 3/1980 | Trombley | 351/160 R |
| 4,198,132 | 4/1980 | Seger et al. | 351/160 R |
| 4,208,364 | 6/1980 | Shepherd | 264/313 |
| 4,208,365 | 6/1980 | LeFerse | 264/313 |
| 4,209,289 | 6/1980 | Newcomb et al. | 264/2.2 |
| 4,285,890 | 8/1981 | Mizutani et al. | 264/1.1 |
| 4,313,355 | 2/1982 | Becker et al. | 82/1 C |
| 4,333,368 | 6/1982 | Watt | 82/1 C |
| 4,407,766 | 10/1983 | Haardt et al. | 425/808 |

*Primary Examiner*—James Lowe
*Attorney, Agent, or Firm*—Nixon & Vanderhye

[57] ABSTRACT

Spherical hydrophilic contact lenses having a characteristic tricurve configuration designed to correct myopia (nearsightedness) are described. The center zone (A1) of the lens is substantially thinner than the periphery (A3) allowing enhanced oxygen transmission and comfortable, increased wearing times while the thicker mid-periphery (A2) imparts necessary integrity and handling characteristics for convenience in manual manipulation. Lenses are molded or cast directly in the desired tricurve configuration using specially designed replica molds made from metal master molds.

6 Claims, 11 Drawing Figures

TRICURVE OPTICAL METAL MASTER MOLD AND METHOD OF MAKING

CROSS REFERENCE TO RELATED APPLICATIONS

This application is a continuation of our earlier application Ser. No. 498,348, filed May 26, 1983, now abandoned.

This invention relates to contact lenses and specifically to spherical hydrophilic contact lenses having a unique tricurve configuration designed to correct myopia (nearsightedness). The lenses are conveniently molded or cast directly in the desired configuration using specially prepared replica molds; procedures for molding lenses are also described.

In a preferred aspect of the invention a hydrophilic contact lens is cast having three distinct zones or curves, the center zone being substantially thinner than the periphery of the lens. Contact lenses designed to correct myopia, in order to refract light and provide the proper optical correction, must be thinner in the center than the periphery of the lens. The thickness differential increases as the dioptric power of the lens increases. Diopters may vary from 0 to −20.0 but are typically in the 0 to −6 range for a large portion of the myopic population; center thicknesses may range accordingly from 0.03 to 0.55 mm. Additionally, it is desirable to design a hydrophilic contact lens as thin as possible, i.e., to have a center thickness of, say, 0.04 mm so that transmission of oxygen through the lens to the wearer's cornea is maximized thus promoting the patient's corneal health during the time the contact lenses are worn. Thin contact lenses may be comfortably worn by the patient for a longer period of time than conventional thickness lenses.

Hydrophilic contact lenses are not rigid but rather are typically a three-dimensional network of one or more polymers in which a substantial quantity, i.e. one-third or more, of water is entrapped. Given the above requirements for center thickness it was found that conventional designs and methods of manufacture were unsuccessful—an ultra-thin hydrophilic contact lens so produced was found to be so thin and flacid that it was extremely difficult to insert and remove, especially as the diopters became lower. Integrity and at least partial stability are required for patient convenience and acceptance of hydrophilic contact lenses, particularly in the lower powers where the lens surfaces are by necessity nearly parallel.

The unique tricurve design lens of the present invention has the necessary strength and provides extra mass at the mid-periphery of the lens thereby imparting the necessary integrity and required handling characteristics to the lens. The lens stands up well on the patient's hand or finger for convenience of manipulation and is relatively easy to insert and remove. As an added benefit the tricurve design serves to increase both tensile and tear strengths of the lens, thus prolonging lens life and reducing the incidence of torn lenses.

The tricurve lenses of the present invention are conveniently prepared by casting or molding. Casting methods are known for preparing contact lenses in order to reduce or eliminate costly machining and polishing of the lens. According to the process described in U.S. Pat. No. 4,121,896 to T. H. Shepherd, complementing replica male and female mold members each having an optical molding surface are prepared by injection molding of a plastic composition in master mold pairs. The plastic mold members are then longitudinally aligned and used to mold contact lenses; preferably one of the molding surfaces is provided with a flexible circumferential rim which defines the periphery of the resulting lens. The lens-forming material which will constitute the lens is charged into the female mold member or portion. The complementing male member or portion is brought into contact with the female mold member so that the flexible rim portion is seated on the opposite molding surface. During molding the lens-forming material contracts causing the flexible rim to flex, inwardly usually, whereby the two mold members move towards each other. Once the molding cycle is completed the mold members are separated and the resulting contact lens is removed in a condition ready for use, except for cleaning and perhaps a buffing of the lens edge.

The tricurve lenses of the present invention are typically spherical, although toric configurations may be prepared. If desired, the lens may be truncated and/or have prism ballast to ensure positional stability when placed on the cornea. Molded toric contact lenses are described in U.S. Pat. No. 4,208,365 to R. J. LeFebre and in copending U.S. application Ser. No. 199,780 in the name of Eric Noble; truncated contact lenses may be molded as described in published PCT Application WO No. 82/04221 in the name of Haardt, Magdon and Noble published Dec. 9, 1982. Molds made of thermoplastic materials, typically polypropylene, are described in U.S. Pat. Nos. 4,121,896; 4,208,364 and 4,208,365.

It is an object of this invention to provide a tricurve hydrophilic contact lens adapted to correct myopia in which extra mass is provided to the midperiphery of the lens thereby imparting the necessary strength and desirable handling characteristics to the flexible lens while increasing both tensile and tear strengths of the lens.

Another object of the invention is to provide a tricurve spherical hydrophilic contact lens of 0 up to −20 diopters, desirably 0 to −8 diopters and preferably 0 to −6 diopters, that is ultra-thin in the center yet retains all of the handling properties of a conventional bicurve lens.

Another object of the invention is to provide a tricurve hydrophilic contact lens that is extremely thin, i.e., from about 0.03 to about 0.05 mm in the center section of the optical zone, thereby having enhanced oxygen permeability and transmittance.

Another object of the invention is to provide a method of casting a tricurve lens directly so that the thus cast lens requires no or virtually no manual finishing.

These and other objects of the invention will be apparent from the following more detailed description and attached drawings.

SUMMARY OF THE INVENTION

The present invention is concerned with a tricurve contact lens, i.e., having three distinct spherical radii defining three distinct areas including a centrical spherical surface acting as an optical zone $A_1$ in the center of the lens. This is the area of the lens that generates the various powers desired and the spherical radius defining this area changes only as the lens powers are changed. Typical diameters of this zone are approximately 8.50 mm measured in the dry (unhydrated) state.

The second zone or portion $A_2$ is annular, contiguous and concentric with the optical zone and has a thickness that increases monotonically radially outwardly from the optical zone. This zone has a flatter radius than the optical zone and also changes from power to power of the lens. The optics within this second zone change necessarily in relation to the change in the optical zone itself; however, the purpose of the second zone is primarily supportive. The spherical radius of this second zone is critical, as it determines lens thickness through the uniqueness of the molding process, described below, which means that by flattening or steepening the spherical radius on the metal master mold, various lens center thicknesses can be obtained. Further, this zone strengthens the lens by providing additional polymer mass to this section, or band, of the lens without adverse effects on the optics or fitting characteristics of the lens.

The third zone $A_3$ tapers in reduced thickness away from the optical zone and defines the outer diameter of the lens. The radius of curvature defining this zone is substantially constant. It may be considered, in isolation, as movable in the vertical direction and thus changing sagittal depth values. Various lens thicknesses are produced by steepening or flattening the spherical radius; compare FIGS. 3 and 4.

In a preferred embodiment a cast contact lens of the present invention is a hemispherical shell of inside spherical radius ranging from 0.5 to 10.8 mm, chord diameter ranging from 12.5 to 18.0 mm, and a center thickness of 0.03 to 1.0 mm, preferably about 0.03 to 0.05 mm and ideally about 0.04 mm. The lens material is a hydrophilic polymer of 2-hydroxyethyl methacrylate cross-linked with ethyleneglycol dimethacrylate. For use and sale the lens is swollen to equilibrium state with 0.9% sodium chloride solution and as such its composition is 62% hydrophilic polymer and 38% water by weight. When placed on the human cornea, the hydrated lens acts as a corrective refracting medium to compensate spherical or toric ametropias. The hydrophilic polymer typically has a refractive index of 1.43 and a visible light transmittance greater than 97%.

Figure 5:
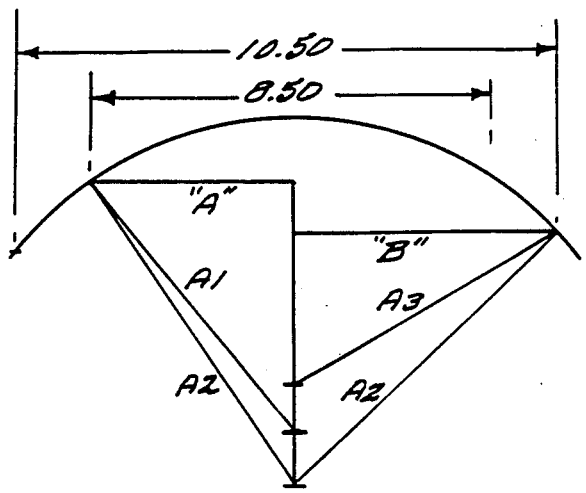
FIG. 5 is a diagrammatical representation of the changes in the spherical radius and radius lathe travel calculations between three different centers of curvature along a common axis.
Figure 7:
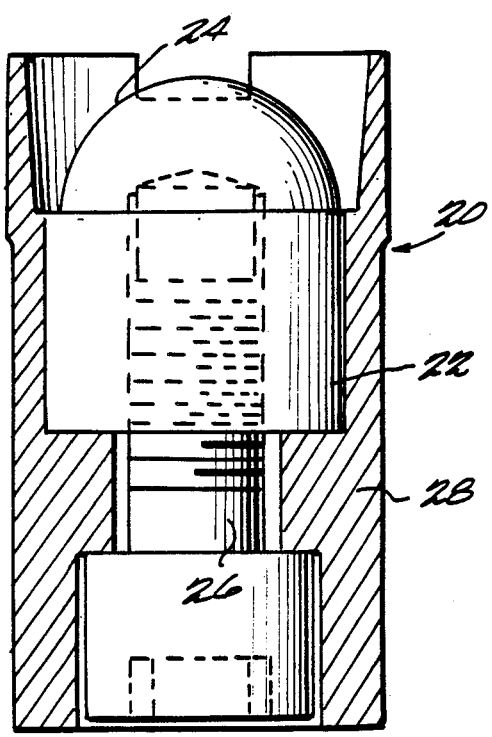
FIG. 7 is a cross-sectional plan view of a metal master mold for forming the optical surface of the plastic replica mold.
Figure 8:
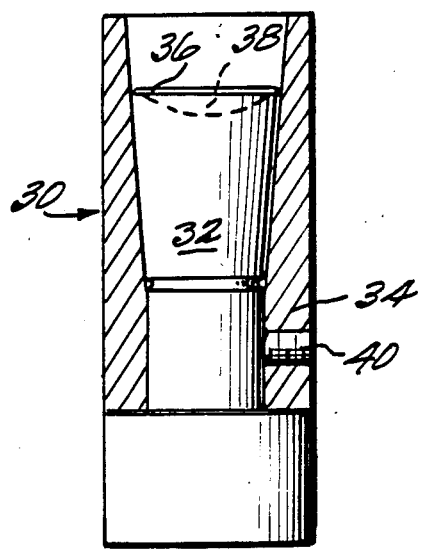
FIG. 8 is a cross-sectional plan view of a metal master mold for forming the base curve surface of the plastic replica mold.
Figure 8A:
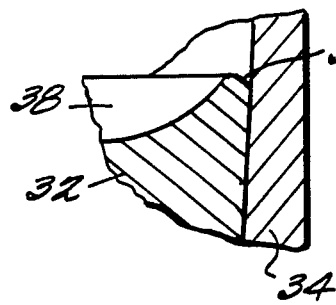
FIG. 8A is an enlarged view of a taper in FIG. 8 that defines a circumferential rim on the male portion of a plastic replica mold.

FIG. 5 is illustrative of the mathematical calculations required to produce a contact lens mold having three distinct spherical radii in accordance with the present invention. FIGS. 7, 8 and 8A will be explained with reference to the procedure for fabricating the metal master mold parts.

Fabrication of the Optical Zone Metal Master: The two-part master metal mold 20 for preparing replica lens molds was prepared in an optical radius lathe in the following manner, referring to the distances represented in FIG. 5. A series of mold-making procedures with precision step-by-step machining, lapping and polishing, including the necessary preliminary mathematical calculations, was instituted to achieve accurate quality optical tricurve metal master molds. The insert 22 defining the optical surface 24 was prepared from a steel blank (254 mm) from bar stock (Colt Industries CSM 414 stainless steel) machined to the rough dimensions of 16 mm then cut to a length of 19 mm. A tapered hole 26 was then bored and reamed into one of the faces of the blank; this tapered hole had a Browne and Sharpe #2 bore. This hole must be accurately placed since the other surfaces, including the optical surfaces, are generated from that point. A 10-inch Hardinge Toolroom lathe was used for these procedures.

Using the same machine the thus-prepared blank was placed on an accommodating Browne and Sharpe arbor to turn a concentricity of 0.005 mm. The optical blank was then turned to a finished over diameter of 15.40±0.01 mm. Next a 5° angle step was turned onto the blank to a length of 6.5 mm with a major diameter of 12.80 mm.

A plus 5° taper with a minus 1° tapered step was cut into the front of the optical mold to its finished dimensions of 12.58 mm and 12.38 mm, leaving a 0.50 step at the front shoulder with a 0.50 mm radius. Also a 5/16-24 thread was cut in the tapered bore to a depth of 14.0 mm to hold the metal mold in position in the optical sleeve 28.

The optical mold sleeve 28 was made of A-6 tool steel and hardened to 56-58RC. The front section was bored to a 15.40 diameter at a depth of 19.80 mm in which the optical mold 22 was positioned. A 5° angle was added to the front for ejection and specified wall thickness of the plastic replica mold to be cast from the metal master. This angle, together with the 19.50 mm diameter, must be ground concentric with the 15.40 inside diameter to avoid distortion within the plastic mold part that would detract from the optical surface parameters and quality.

The following procedures used to prepare the optical surface 24 are important as they control the focus, visual accuracy and thickness of the lens. A Robertson radius lathe was adjusted with respect to proper tool height and center, then the previously prepared mold blank was mounted onto a Brown and Sharpe tapered arbor previously attached to the radius lathe's headstock spindle to cut a tapered hole.

First, to establish a reference starting point, the $A_1$ radius was set on the lathe dial, and the lathe touched and cut the center of the mold blank; headstock was set to 3.0 mm. This procedure provided a reference starting point. The $A_1$ radius determines the correction or power of the resulting lens. The headstock was then set to a predetermined travel after first calculating the various radii depicted in FIG. 5. The $A_2$ radius was set, then cut into the insert 22 by adjusting the memory stops until a proper optical zone 24 was obtained. Optical zones were inspected visually with a toolmaker's microscope (accurate to within 0.005 mm). Next, the $A_1$ radius was reset on the lathe dial, the lathe head repositioned to the proper travel and the corresponding $A_1$ zone was cut into the blank to blend with $A_2$ at the proper coordinates. Finally, the radius lathe was set to the $A_3$ radius (memory stops are not needed because the $A_3$ radius is smaller or steeper than $A_1$ and $A_2$, by-passing both as it was cut into the mold blank). The $A_3$ radius is, however, locked in with the same $A_1$, $A_2$ travel and center thickness calculations.

Machining of the tricurve metal master mold 20 is an exacting, complicated, precise and permanent operation—all of the tricurve radii sags must match and correspond with the base curve sags so that a nominal predetermined center thickness, for example 0.04 mm, is obtained. Because the $A_2$ radius is larger than the $A_1$ radius, care must be taken when cutting into the $A_1$ radius so that the entire metal mold blank is not scraped. The $A_2$ radius is critical as it determines the nominal center thickness of the lens.

Polishing the tricurve metal mold blank is also an operation that requires care and precision as the optical radius must have crisp focus, perfect radius size, and a quality surface finish allowing all three curves to blend into each other at the $A_1/A_2$ and $A_2/A_3$ junctions. The thus machined mold was placed on a Levins lens surfacer polishing machine also fitted with an accommodating Brown and Sharpe arbor. Polishing compounds of various grades and wooden dowels were used. A separate dowel was used for each radius, each dowel having the required radius cut into it. First, a wooden dowel carrying No. 3 polishing compound was used to polish the exact radius. The radii were polished in order; $A_1$ then $A_2$ then $A_3$. The mold was spun on center with the appropriate size wooden dowel oscillating above it. Various oscillating angles, degree spreads and wood diameters were used for the corresponding radii being polished. Polishing at this point was considered complete when all of the tool marks were removed and a crisp focus was obtained.

Final polishing was accomplished with a cloth-covered sponge pad impregnated first with No. 1, then No. ½ micron diamond polishing compound. This brought the tricurves into crisp focus and luster, and eliminated all scratches from the steel surface.

Figure 3:
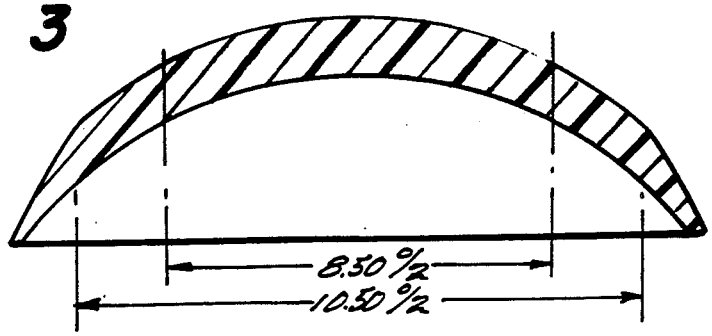
FIGS. 3 and 4 are plan cross-sectional views of lenses according to the invention illustrating different lens thicknesses and corresponding changes in the spherical radii of the zones in each.
Figure 4:
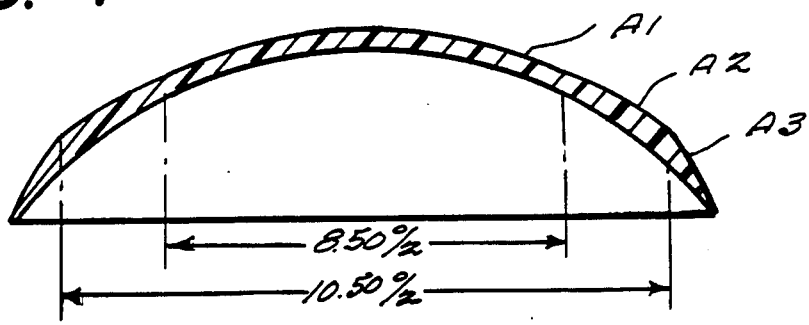

Numerical values for the optical surfaces of the lenses depicted in FIGS. 3 and 4 and the lathe travel representations of FIG. 5 are as follows:

| Figure | diameter[1] | | | spherical radius[1] | | |
|---|---|---|---|---|---|---|
| | $A_1$ | $+A_2$ | $+A_3$ | $A_1$ | $A_2$ | $A_3$ |
| 3 | 8.50 | 10.50 | 11.98 | 7.45 | 8.00 | 7.04 |
| 4 | 8.50 | 10.50 | 11.98 | 7.45 | 8.50 | 7.04 |
| 5 | 8.50 | 10.50 | 11.98 | V[2] | V | V |

[1] in millimeters measured in the dry, unhydrated state.
[2] variable in accordance with the desired optical power.

Fabrication of the Base Curve Metal Master: The base curve metal master mold 30 comprises two units, a base curve insert 32 and a bushing 34. Both parts were made from 414 stainless steel, as described above. Using the same equipment bar stock was turned down from 25 to 13.0 mm. The compound setting on the Hardinge lathe was set to 5° and a 5° taper was turned from 13.0 mm to a diameter of 9.52 mm. At the same time a 9.52 mm diameter straight section was machined to a length of 10.0 mm. Using the same compound set-up, the internal tapered angle from 13.04 mm diameter to a 9.52 mm diameter, length 10 mm, was machined into bushing 34. Both the insert 32 and the bushing 34 should have precise tapers that mate perfectly together. The tapered fits align with each other so that the 0.07 mm edge on the steel insert 32 will produce replica plastic molds with the desired parameters. An arbor was used with a Hardinge 10-inch lathe spindle on which the base curve bushing was mounted and the outside diameter turned to its proper size of 17.22 mm. This insures total concentricity.

Figure 1:
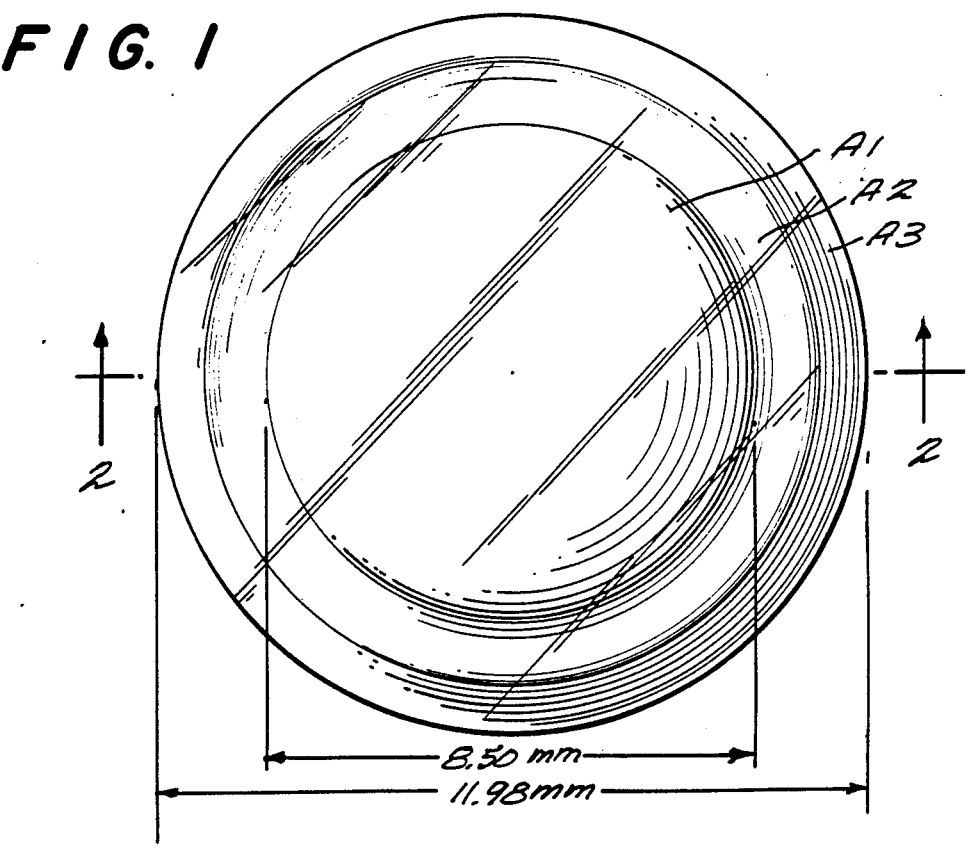
FIG. 1 is a plan view of a tricurve contact lens showing the three distinct zones or areas in accordance with the invention.
Figure 2:
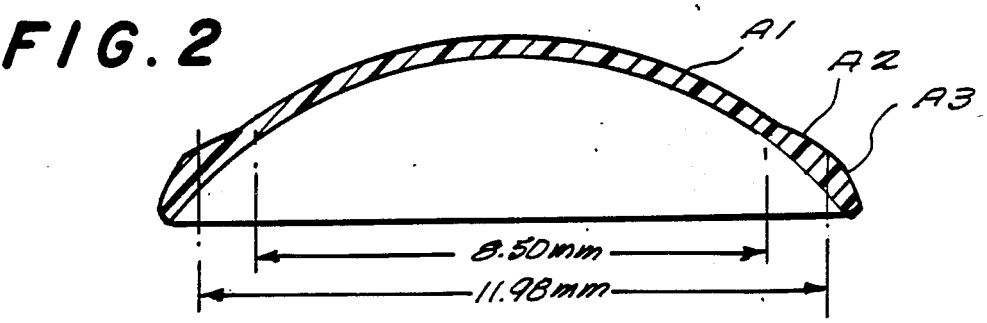
FIG. 2 is a cross-sectional view of the lens of FIG. 1 taken along line 2—2.

Next the base curve insert 32 was positioned into the spindle of a Levine radius lathe and the tapered insert is machined to a concentricity of 0.005 mm upon which the base curve radius was machined. The proper sagittal depth was determined using the following formula:

$$h = r\, V_2 \sqrt{4r^2 - C^2}$$

in which h is the total sag height of the optical metal mold and the base curve metal mold, r is the radius defining zones $A_1$ or $A_2$ and C is a chord representing ½ of the diameter of the optical zone, which in the case of FIG. 1 is ½ of 8.50 or 4.25 mm for zone $A_1$ and ½ of 10.50 or 5.25 mm for the sums of the diameters of zones $A_1$ and $A_2$.

Using the identical dial travel calculations that were used in making the metal mold to define the optical surface, the peripheral radius was cut into the base steel. A 15.90 mm diameter wood lap, having the same radius as the base radius required and a tapered hole on the rear side of the wood to match the Levine single spindle polisher, was mounted on a Levine polisher. The mold was mounted onto the wood lap and held by the polishing machine's wood stylus. Both the wood lap and the steel mold were spun using a rocking motion of about 30° until all tool marks were removed and smooth optical surfaces obtained. Next the edge was placed in the mold insert using a concave radius 6.84 mm wood. The wood was mounted on the polishing machine with the base curve insert 32, which was held by hand, placed onto the spinning wood. The procedure was repeated until a 0.07 mm edge 36 was obtained. Edge 36, shown in more detail in FIG. 8A, defines the flexible circumferential rim on the plastic replica mold made from the metal mold 30. Final polishing was accomplished in the same manner as the metal optical curve 38 mold. The two finished units 32 and 34 were fit together and the insert held in place with a 10-32 set screw 40.

The diameter of the optical metal mold 20 with the 5° angle was 0.40 mm larger than that of the base curve metal mold 30 to provide for proper spacing and escape of excess monomer. The 1° reverse taper acts as a guide for the base curve plastic part by preventing prism within the lens.

Plastic replica molds made of thermoplastic resins, e.g., polypropylene, were prepared from the finished metal master molds by conventional injection molding techniques. Plastic replica molds were prepared in the manner described in U.S. Pat. No. 4,121,896; U.S. Pat. No. 4,208,364 and U.S. Pat. No. 4,208,365, mentioned above, the disclosures of which are incorporated herein by reference as if set out in full text.

Figure 6:
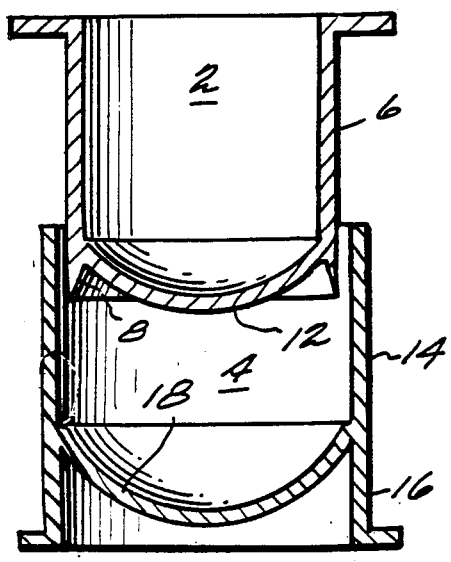
FIG. 6 is a plan cross-sectional view of a replica lens mold in the open position.

FIG. 6 shows one embodiment of a plastic replica mold which comprises a male mold member 2, which may be of a flexible or rigid material, and a female mold member 4. The male mold member 2 includes a substantially cylindrical support segment 6 having attached to the lower end thereof a flexible rim 8. The cylindrical support segment 6 may be hollow, as shown, or a solid mass of material. The flexible rim 8 is circular about the periphery of support segment 6. Support segment 6 is closed by molding surface 12 circumferentially attached to the bottom of support segment 6 and defines the base curve of the molded contact lens. The curvature of molding surface 12 is selected in order to correspond with the optical requirements of the lens to be produced. The curvature of the complementing molding surface 18 contains three distinct zones, as described above, and defines the optical curve of the resulting lens. The optical zone may be entirely spherical, aspherical or combinations of both. The female molding surface 16 defining the back curve of the finished lens is typically spherical but may also be toric, aspherical or combinations of both.

Female mold member 4, which may be rigid or flexible, includes a cylindrical support segment or wall 14 in a base 16 set circumferentially thereto and an optical molding surface 18 set internally in cylindrical support segment 14. The internal diameter of female support segment 14 is somewhat larger than the external diameter of male support segment 6 to allow freedom of insertion.

Figure 9:
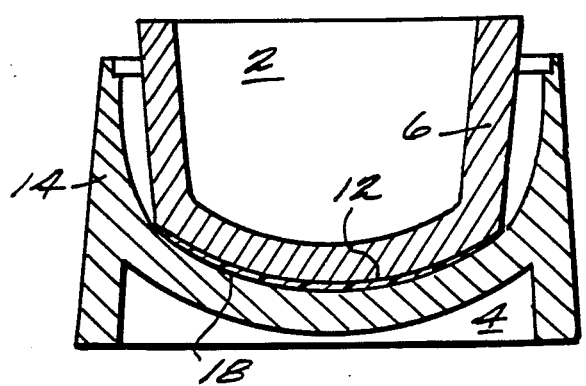
FIG. 9 is a cross-sectional plan view of another embodiment of a plastic replica mold injection molded from the metal master molds of FIGS. 7 and 8.
Figure 9A:
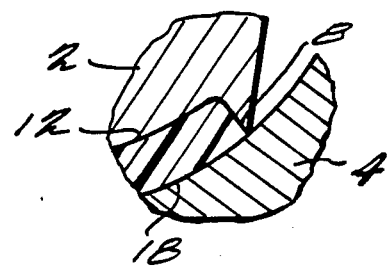
FIG. 9A is an enlarged view of the circumferential rim from the plastic male mold part of FIG. 9.

Another embodiment of the plastic replica mold is shown in FIGS. 9 and 9A injection molded from the metal master molds of FIGS. 7 and 8. FIG. 9A is an enlarged illustration of flexible circumferential rim 8.

The process of the invention is not limited to truncated soft plastic contact lenses, i.e., hydrogels in their hydrated state, although these are preferred articles. Also included are the hard or rigid contact lenses as well as flexible, hydrophobic contact lenses.

The novel process results in advantages over prior art methods in that a contact lens is cast directly from the desired lens-forming material; polishing of the optical surfaces is not required; only minimum finishing or buffing of the lens edges may be required; and the overall manufacturing is far less labor intensive than with prior procedures. As with most soft lenses the lens will be washed with water to remove any catalyst residue and unreacted monomer, then equilibrated in aqueous or saline solution to attain its final dimensions.

By practice of a preferred aspect of the invention there is obtained, in an economic manner, a wide variety of contact lenses which exhibit a wide range of cylinder powers, usually in the negative diopter powers.

By the practice of the invention there can be obtained, as a novel article of manufacture, a molded, tricurve contact lens having three distinct zones or areas on the optical surface thereof and a continuous smooth outer circumference. The lens power ranges from 0 to −20 diopters, desirably from 0 to −8 diopters, and preferably from 0 to −6 diopters. Preferably this novel article is hydrogel, especially a hydrophilic polymer containing a major amount of 2-hydroxyethyl methacrylate (HEMA).

One of the molding surfaces, usually the male mold member, preferably is provided with a flexible, integral circumferential rim, which in the practice of a preferred aspect of the invention will define the periphery or edge of the resulting contact lens. During the molding operation, the lens-forming material contracts (especially during addition or condensation reactions) causing the flexible rim to flex, usually inwardly with respect to the circumferential axis of the molds, whereby the two mold members move toward each other. For further details of flexible rim construction, materials, etc., one is referred to U.S. Pat. Nos. 4,121,896 and 4,208,365, the disclosures of which are fully incorporated by reference as if set out in full text.

The tricurve contact lenses produced by the present invention may be flexible, hydrophobic lenses as exemplified by the unsubstituted and fluorosubstituted polyethylene, the silicone elastomers, etc.; or such contact lenses may be the so-called hydrophilic lenses described having a three-dimensional structure such as polymers of 2-hydroxyethyl methacrylate, the various hydrolyzed hydrophilic collagen products, etc. The hydrophilic lenses are water-insoluble, water-swellable, and when immersed in water or saline solution, swell to attain their final dimensions. The resulting water-swollen lenses may be properly termed hydrogel lenses.

Monomer, prepolymer or vulcanizable mixtures particularly useful in the practice of this invention include hydrophobic acrylic esters, suitably lower alkyl acrylic esters, the alkyl moiety containing 1–5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or various mixtures of these monomers. For increased dimensional stability and resistance to warpage, the above monomers or monomer mixtures may be further admixed with a minor proportion of di- or polyfunctional polymerizable species to cause crosslinking of the polymeric matrix as polymerization proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers may include N,N-methylene-bisacrylamide or methacrylamide, sulfonated divinylbenzene, and divinyl sulfone.

The above monomers or mixtures thereof may be further mixed with linear polymeric species which are soluble therein as long as the viscosity of the solution or "casting syrup" formed thereby does not become sufficiently great that difficulty in removing bubbles therefrom is encountered.

Other monomeric materials suitable for producing lenses via this invention are hydrophilic monomer mixtures forming three-dimensional crosslinked networks such as those described in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethacrylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimthylmethacrylamide, and the like; N-vinylpyrrolidone; the alkyl substituted N-vinylpyrrolidones, e.g., methyl-substituted N-vinylpyrrolidone; glycidyl methacrylate; glycidyl acrylate; and others known to the art. Also useful are the vulcanizable silicone fluids or elastomers. Preferably, the alkyl and alkylene moieties in the aforementioned subclasses of compounds contain up to 4 carbon atoms.

With the hydrophilic monomer or mixtures thereof, it is preferrd that a three-dimensional cross-linked network be formed. For this purpose it is desirable to employ small amounts of cross-linking monomers such as those illustrated above with respect to the discussion on hydrophobic acrylic esters or other cross-linking techniques, e.g., radiation.

Preferred monomeric mixtures contain at least one alkylene glycol monoester or methacrylic acid, especially ethylene glycol monomethacrylate, and at least one cross-linking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, N-methacrylamide, diethylene glycol monomethacrylate, and others illustrated above.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent, if employed, can comprise a minor amount of the reaction medium, i.e., less than 50 weight percent.

Polymerization of monomer mixtures is usually carried out with free radical catalysts of the type in common use in vinyl polymerization. Such catalyst species include organic peroxides, percarbonates, hydrogen peroxides, and inorganic materials such as ammonium, sodium, or potassium persulfate. Polymerization using such catalysts may occur at temperatures between ambient temperature, i.e., about 20° C. or up to about 120° C., depending on the speed of polymerization desired.

Polymerization may also occur between monomer or prepolymer mixtures under the influence of elevated temperatures or radiation (U.V., X-ray, or other well-known forms of radioactivity).

With silicone elastomers, vulcanization may take place via a free radical curing mechanism or, in the case of two-part so-called RTV compounds, vulcanization may occur through displacement or condensation reactions. Patents which further illustrate the lensforming materials useful in the preparation of contact lenses include, by way of examples, U.S. Pat. No. Re. 27,401; U.S. Pat. Nos. 3,639,524; 3,699,089; 3,700,761; 3,822,089; 4,121,896; 4,208,365; and 4,223,984; the full disclosures of which are incorporated by reference as if set out in full text.

Casting Lenses: Two polypropylene molds were produced from the metal master molds described and illustrated above by the use of injection molding equipment. The two complementing molds had predetermined parameters, one mold being the optical curve plastic (female), the other being the base curve place (male). The female molds were filled with 45 ml. of a liquid monomer mixture composed of 2-hydroxyethyl methacrylate (97.6%), ethyleneglycol dimethacrylate (1.4%) and bis(4t-butylcyclohexyl) peroxydecarbonate (1%). Once filled, the male mold was placed inside the female mold, as shown in FIG. 9, and the filled molds were placed in an oven at a temperature of 125° C. for a period of 30 minutes to polymerize the liquid monomer. The molds were removed from the oven, allowed to cool; then the finished lens was removed from the mold and dimensions were checked.

Lenses produced from specific plastic molds which were injection molded from steel master molds all had the same dimensions. These dimensions, all given in mm, were as follows:

| Optical Curve | | | |
| --- | --- | --- | --- |
| A-1 Optic Zone = 8.50 | All diopters | | |
| A-2 Optic Zone = 10.50 | | | |
| | A1 Radius | A2 Radius | A3 Radius |
| Plano | 7.00 | 7.62 | 7.04 |
| −0.50 diopter | 7.22 | 8.35 | 7.04 |
| −1.00 diopter | 7.30 | 8.22 | 7.04 |
| −1.50 diopter | 7.40 | 7.90 | 7.04 |
| −1.75 diopter | 7.45 | 7.90 | 7.04 |
| −2.00 diopter | 7.48 | 7.79 | 7.04 |
| −2.50 diopter | 7.55 | 7.76 | 7.04 |
| −2.75 diopter | 7.66 | 7.57 | 7.04 |
| Base Curve | | | |
| Base Curve Diameter | 11.98 | All Diopters | |
| Base Curve Cord | 11.36 | | |
| Peripheral Width | 0.31 | | |
| Edge Height | 0.07 | | |
| Base Curve Radius | 7.18 | | |
| Peripheral Radius | 7.86 | | |

We claim:

1. A metal master mold for injection molding a plastic replica mold comprising the following distinct spherical zones as a molding portion:
   a central spherical surface having a radius $A_1$ and an edge;
   a first annular zone $A_2$ concentric with said spherical surface and having an inner edge contiguous with said spherical surface edge and outer edge; and
   a second annular zone $A_3$ concentric with said first annular zone outer edge;
   the molding portion being polished to blend the spherical zones into each other at the $A_1/A_2$ and $A_2/A_3$ junctions.

2. A process for making the optical surface of a metal master mold for injection molding a plastic replica mold for molding hydrogel contact lenses having the following distinct spherical zones;
   a central spherical zone $A_1$ having an edge,
   a first annular zone $A_2$ concentric with said spherical surface and having an inner edge contiguous with said spherical surface edge and an outer edge; and
   a second annular zone $A_3$ concentric with said first annular zone having an inner edge contiguous with said first annular portion outer edge, said process comprising the successive steps of:
   (1) selecting a cylindrical metal blank and determining its optical center;
   (2) calculating an $A_1$ radius to determine the correction or power of the resulting lens, an $A_2$ radius to define the first annular zone and to determine the nominal center thickness of the lens, and an $A_3$ radius to define the second annular zone;
   (3) cutting an $A_1$ radius in the metal blank to establish a predetermined central reference starting point;

(4) cutting an $A_2$ radius in the metal blank until the desired optical zone and nominal center lens thickness are obtained;

(5) cutting an $A_1$ radius in the metal blank to blend the $A_1$ radius with the $A_2$ radius at predetermined co-ordinates;

(6) cutting an $A_3$ radius to a predetermined diameter defining the outer circumference and tapered shape of the lens; and (7) polishing the cut metal master to assure all three curves to blend into each other at the $A_1/A_2$ and $A_2/A_3$ junctions.

3. The process in according with claim 2 in which the optical surface of the metal mold so produced molds a hydrogel contact lens having a lens power from 0 to $-20$ diopters.

4. The process in according with claim 3 in which the optical surface of the metal mold so produced molds a hydrogel contact lens having a lens power from 0 to $-8$ diopters.

5. The process in according with claim 4 in which the optical surface of the metal mold so produced molds a hydrogel contact lens having a lens power from 0 to $-6$ diopters.

6. The process in accordance with claim 2 in which the optical surface of the metal mold so produced molds a hydrogel contact lens in which the optical zone has a nominal center thickness of about 0.04 mm $\pm$ 0.02 mm.

* * * * *